US008000247B2

(12) United States Patent
Urano et al.

(10) Patent No.: US 8,000,247 B2
(45) Date of Patent: Aug. 16, 2011

(54) BANDWIDTH MANAGEMENT APPARATUS

(75) Inventors: Hiroshi Urano, Kawasaki (JP);
Masayuki Ogawa, Kawasaki (JP);
Toshihiro Koji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 905 days.

(21) Appl. No.: 11/386,936

(22) Filed: Mar. 23, 2006

(65) Prior Publication Data
US 2007/0147422 A1    Jun. 28, 2007

(30) Foreign Application Priority Data
Dec. 28, 2005   (JP) .................................. 2005-379477

(51) Int. Cl.
*H04L 12/26* (2006.01)
(52) U.S. Cl. .................................................. 370/235.1
(58) Field of Classification Search .................. 370/230, 370/230.1, 235, 235.1
See application file for complete search history.

(56) References Cited

U.S. PATENT DOCUMENTS

| 5,625,622 | A  | * | 4/1997 | Johri | 370/235.1 |
| 6,205,149 | B1 | * | 3/2001 | Lemaire et al. | 370/401 |
| 7,342,929 | B2 | * | 3/2008 | Bremler-Barr et al. | 370/395.4 |
| 2001/0033581 | A1 | * | 10/2001 | Kawarai et al. | 370/468 |
| 2004/0085979 | A1 | * | 5/2004 | Lee et al. | 370/412 |
| 2004/0190552 | A1 | * | 9/2004 | Kim et al. | 370/469 |

FOREIGN PATENT DOCUMENTS

JP    2005-244417    9/2005

* cited by examiner

*Primary Examiner* — Derrick Ferris
*Assistant Examiner* — Omar Ghowrwal
(74) *Attorney, Agent, or Firm* — Staas & Halsey LLP

(57) ABSTRACT

In a bandwidth management apparatus that outputs packets by observing the bandwidth set value predetermined for each destination, provisions are made to prevent a situation where the contracted bandwidth cannot be provided due to influences from packets destined for other destinations. When performing bandwidth management using token buckets provided one for each destination, each token bucket is updated by setting the upper limit token value higher when any packet is stored in the corresponding queue than when no packets are stored; this serves to prevent a situation where even when a packet has already arrived at the queue, the packet cannot be output because a packet is being output from some other queue and, as a result, unconsumed tokens are discarded at the next update time.

5 Claims, 10 Drawing Sheets

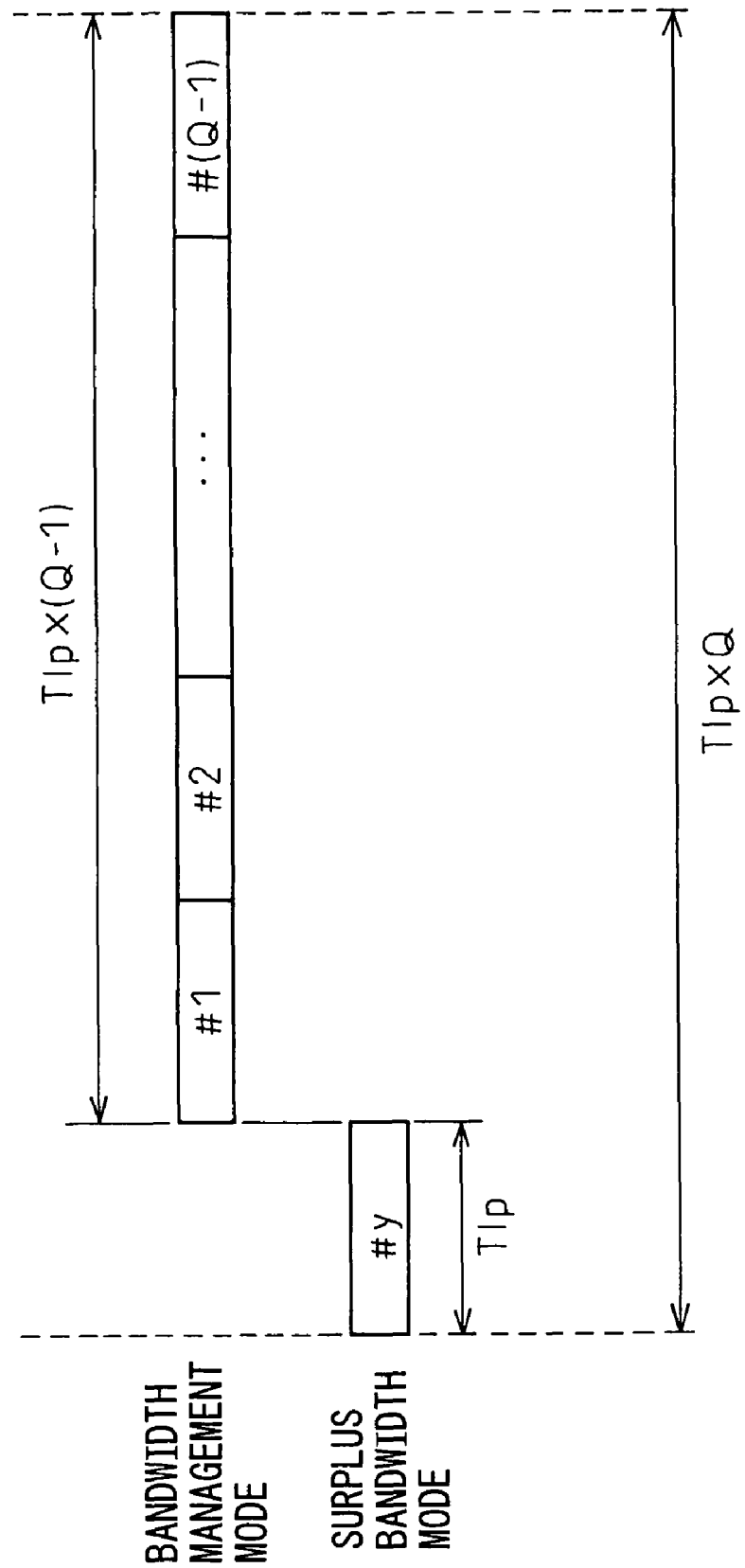

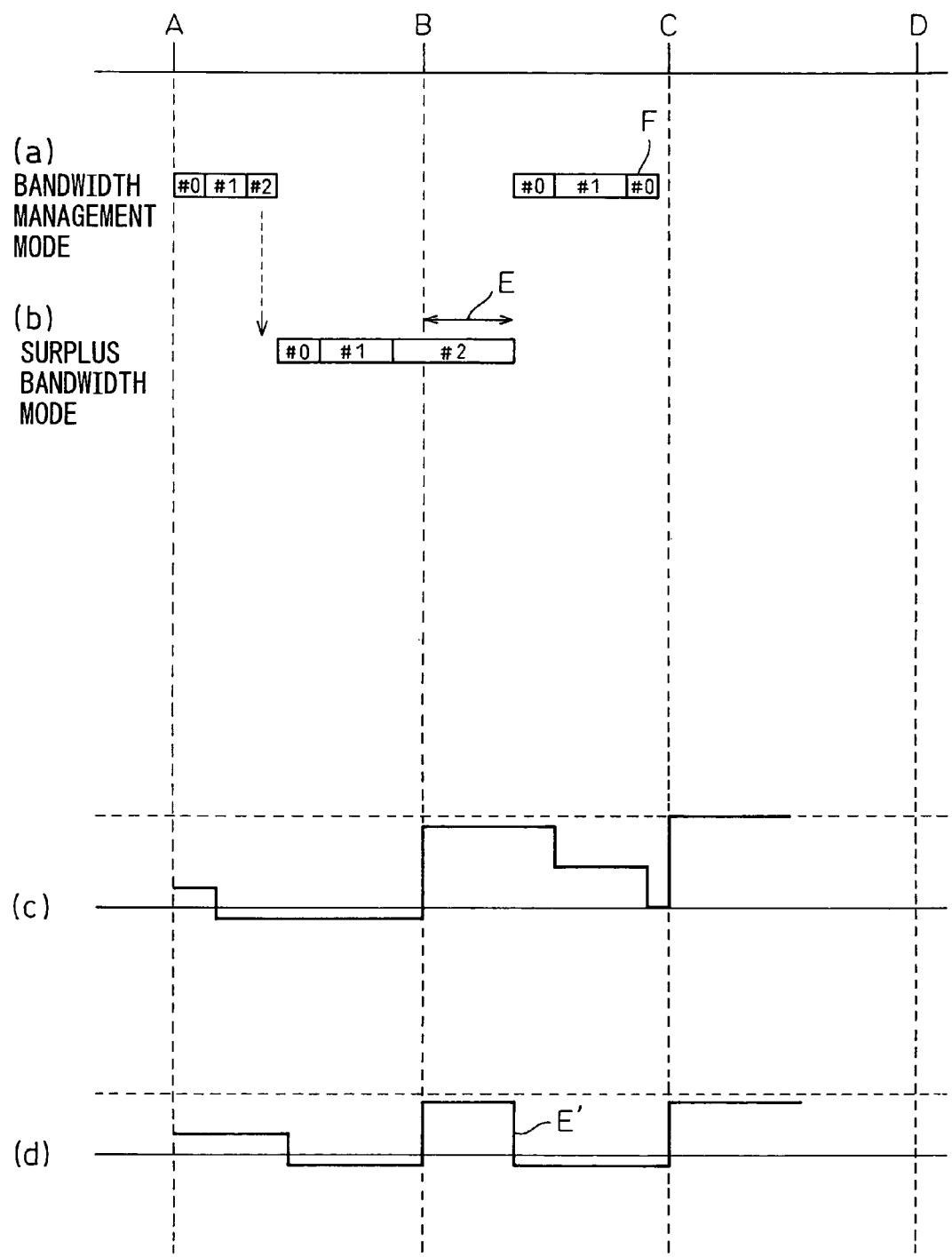

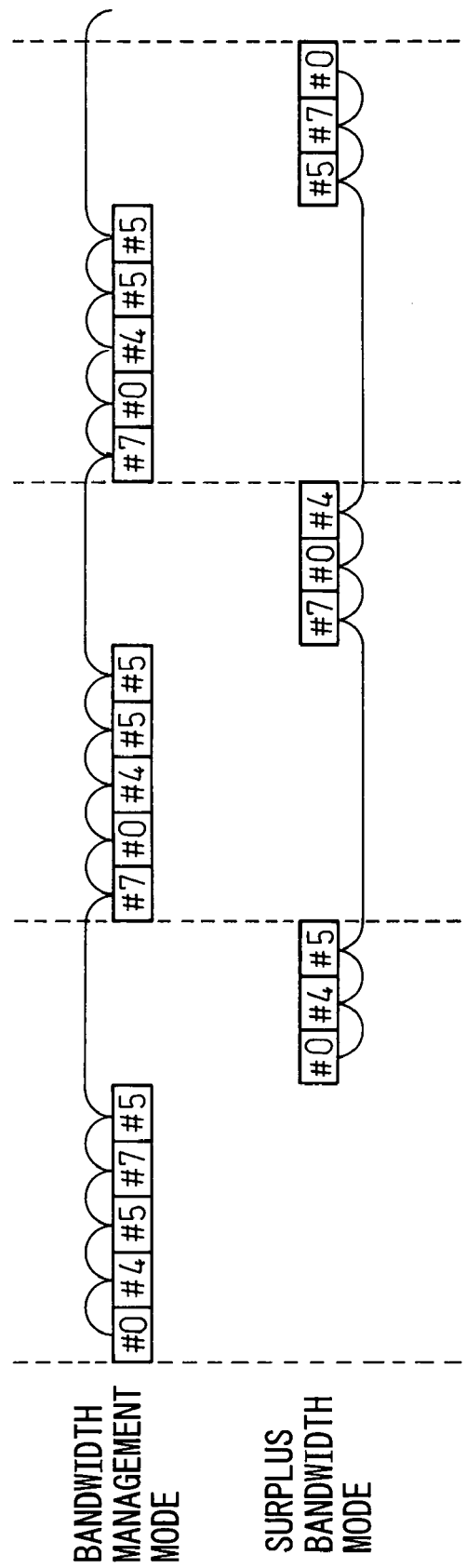

BANDWIDTH MANAGEMENT APPARATUS

BACKGROUND OF THE INVENTION

1. Field of the Invention

The present invention relates to a bandwidth management apparatus that outputs packets in accordance with the bandwidth set value predetermined for each packet destination.

2. Description of the Related Art

In layer 2 switches, etc., bandwidth management is performed in which packets are output by observing the bandwidth set value predetermined, for example, under a contract with a user, for each frame or packet destination (for example, the destination MAC address in the packet—hereinafter, frames and packets will be collectively referred to as packets).

In this bandwidth management, each arriving packet is stored in a designated one of a plurality of queues according to its destination, and the plurality of queues are sequentially referred to in accordance with a simple round robin scheme; then, if any packet is stored in the queue thus referred to, and if the bandwidth that would be used if the packet were transmitted out from that queue does not exceed the bandwidth set value, then the packets are transmitted out one by one. For this purpose, a token bucket is provided for each queue, and control is performed so that tokens equal in value to the bandwidth set value are added to the token bucket at predetermined update intervals, and so that, when transmitting out a packet, tokens equal in value to the packet length of the packet to be transmitted out are removed from it, with provisions made to permit the transmission of the packet when the tokens contained in the token bucket are larger in value than a predetermined threshold value. An upper limit is imposed to how many tokens can be accumulated in the token bucket while no packets are arriving; with this upper limit, the peak value of the bandwidth used is limited if, thereafter, packets arrive in bursts.

The threshold value is set, for example, to 0, which means that when the token value of the token bucket is positive, the packet is transmitted out. The upper limit value is usually set equal to the bandwidth set value×1; with this setting, since tokens are not accumulated beyond the bandwidth set value when no packets are arriving, if thereafter packets arrive in bursts, the packets can be output by observing the bandwidth set value.

FIG. 1 shows one example of control in the bandwidth management mode. Parts (a) to (c) show the arriving packets destined for #0, #1, and #2, respectively (i.e., the packets arriving at queues #0, #1, and #2, respectively), part (d) shows the token add time, part (e) shows the packets to be transmitted out, and parts (f) to (h) show the change in the amount of tokens in the token buckets (#0 to #2) corresponding to the respective destinations #0 to #2.

It is assumed that, by the token add time A, packets have arrived one for each of the queues #0 to #2, as indicated by reference character B. When tokens are added at the token add time A, and the token value of each token bucket therefore becomes positive (parts (f) to (h)), the packets are output in the order of #0, #1, and #2 (part (e)), and the token value of each token bucket is reduced by an amount equal to the packet length of the transmitted packet (parts (f) to (h)). As a result, the token value of each of the token buckets #0 to #2 becomes negative; therefore, if any packets arrive at the queues #0 to #2, the packets cannot be output until the next token add time arrives. At the next token add time C, tokens are added to each token bucket in accordance with the bandwidth set value, and thereafter, the packets (D) that have arrived by that time are sequentially output (part (e)). Here, by the time that the packet for #2 is output, the next packet (E) for #0 has already arrived and, since the token value of the token bucket #0 (part (f)) is positive, the packet for #0 is transmitted out following the transmission of the packet for #2.

In some cases, surplus bandwidth mode control may be performed in addition to the above bandwidth management control. In the bandwidth management mode, when the token value of the token bucket is below the threshold for all the queues in which packets are stored, packet output permissions cannot be granted until the next update time arrives; in such a case, in the surplus bandwidth mode, control is performed so that packet output permissions are granted to queues reserved for users contracted for the use of the surplus bandwidth.

FIG. 2 shows one example of control in the surplus bandwidth mode. As in the case of FIG. 1, when the packets B that arrived by the update time A are sequentially output (part (e)), the values of the token buckets #0 to #2 become negative (parts (f) to (h)). At this time, if a packet D arrives at the queue #0 contracted for the surplus bandwidth mode, the packet is output as shown in part (e'). In this case, no tokens are removed because the packet is output using the surplus bandwidth (part (f)).

FIG. 3 is a diagram for explaining a problem that can occur in the bandwidth management mode. Part (a) shows the token add time, part (b) shows the packets arriving at the queue #0, part (c) shows the packets output from the queues #0 to #2, and part (d) shows how the token value of the token bucket #0 changes. A dashed line extending horizontally in part (d) indicates the upper limit value of the token bucket, which is set equal to the bandwidth set value×1.

In FIG. 3, the packet E that has been stored in the queue by the update time A is output during an interval A-B between the update time A and the update time B. The packet F that has been stored by the update time B is output during an interval B-C. When the tokens equal in value to the bandwidth set value×1 are added at the update time B, any tokens exceeding the upper limit are discarded as shown by an arrow G in part (d), but this does not present any problem. The reason is that, in the interval A-B, the packet E was the only packet that had arrived at the queue #0 and was therefore able to be output during that interval, and the discarded bandwidth G is equal in value to the bandwidth G', indicated by an arrow G', which was not used in the interval A-B.

On the other hand, at the update time C also, the token value is truncated as shown by an arrow H, but this presents a problem. The reason is that, in the interval B-C, not only the packet F but other packets I, J, and K also arrived at the queue #0 (part (b)) but, as a long packet L was output from the queue #2 over the period extending beyond the update time C, the bandwidth H' remained unused and the bandwidth H corresponding to it was discarded without being used. This means that the contracted bandwidth could not be provided because of the packet output from another queue.

One possible method to prevent this would be to increase the upper limit of the token bucket. In that case, however, tokens would be excessively accumulated while no packets were being input, eventually allowing bursts of packets to be output.

FIG. 4 is a diagram for explaining a first problem that can arise when the surplus bandwidth mode is permitted. In FIG. 4, part (a) shows the token add time, part (b) shows the packets output in the bandwidth management mode, and part (c) shows the packets output in the surplus bandwidth mode.

In the interval A-B, the packets in the queues #0 to #2 are output in the bandwidth management mode, and the token values of the token buckets #0 to #2 become negative; in this case, even if any packets remain in the queues #0 to #2, the packets cannot be output in the bandwidth management mode, but if the queues #0 to #2 are permitted to output the packets in the surplus bandwidth mode, then the packets are output sequentially in the surplus bandwidth mode, as shown in part (c). At this time, if the packet last output in the surplus bandwidth mode (in the example, the packet from the queue #2) is so long that it overlaps into the next interval B-C as shown by an arrow E, the start of the bandwidth management mode in the interval B-C will be correspondingly delayed. Then, the packet F in the queue #0, which should have normally been output during the interval B-C, will be output during the interval C-D, leading to the problem of improper token discarding as in the earlier described case.

FIG. 5 is a diagram for explaining a second problem that can arise when the surplus bandwidth mode is permitted. In FIG. 5, part (a) shows the packets output in the bandwidth management mode, and part (b) shows the packets output in the surplus bandwidth mode. As shown, packets of identical length are contained in the respective queues #0, #4, #5, and #7; assume here that the bandwidth set value for each of #0, #4, and #7 is set equal to a value that permits one packet to be output within each add interval, while for #5, it is set to a value that permits two packets to be output, and also assume that the use of the surplus bandwidth is permitted for all of #0, #4, #5, and #7, and that packets are input to each queue at a rate higher than the bandwidth set value. In this case, as can be seen from FIG. 5, the packet last output in the bandwidth management mode is always the packet from the queue #5 and, as a result, the packet first output in the surplus bandwidth mode is always the packet from the queue #7 that follows the queue #5. Further, the packet last output in the surplus bandwidth mode is always the packet from the queue #4 and, as a result, the packet first output in the bandwidth management mode is always the packet from the queue #5 that follows the queue #4. Therefore, the queue #5 is not selected in the surplus bandwidth mode, resulting in unfair scheduling between channels.

To further generalize, the queue (in the above example, #5) given the highest bandwidth set value of all the queues is highly likely to be scheduled to be output last in the bandwidth management mode, and as a result, the probability of the ensuing queue (in the above example, #7) being scheduled in the surplus bandwidth mode increases, thus resulting in unfair output scheduling.

SUMMARY OF THE INVENTION

Accordingly, a first object of the present invention is to prevent excessive token accumulation as well as token discarding that can occur due to influences from other channels when bandwidth management is performed in the bandwidth management mode.

A second object of the invention is to avoid the problem of token discarding associated with the surplus bandwidth mode.

A third object of the invention is to prevent unfair scheduling between channels that can occur when the surplus bandwidth mode is permitted.

According to one aspect of the present invention, the first object is achieved by providing a bandwidth management apparatus comprising: a queue management control section which stores each arriving packet in a designated one of a plurality of queues according to the destination thereof; a bandwidth management control section which adds tokens corresponding to a bandwidth set value predetermined for each destination, but not exceeding a prescribed upper limit value, at every predetermined interval to each of a plurality of token buckets corresponding to the plurality of queues, and which, when a packet is output from any one of the plurality of queues, removes tokens corresponding to the packet length of the output packet from the token bucket corresponding to the queue from which the packet is output; and a scheduling section which sequentially refers to the plurality of queues in a predetermined order, and which outputs packets one by one if any packets are stored in the queue referred to and if tokens contained in the token bucket corresponding to the queue referred to are larger in value than a predetermined threshold value, wherein: the upper limit value of the tokens to be contained in the token bucket when any packet is stored in the corresponding queue is set higher than the upper limit value when no packets are stored in the corresponding queue.

The problem of improper token discarding occurs because the next token update time arrives when a packet is present in the queue and its token value is still above the threshold value; therefore, by setting the upper limit value of the tokens to be contained in the token bucket higher when any packet is stored in the queue than when no packets are stored in the queue, the problem of improper token discarding is solved and, in addition to that, excessive accumulation of tokens can be prevented when no packets are arriving.

According to another aspect of the present invention, the second object is achieved by providing a bandwidth management apparatus comprising: a queue management control section which stores each arriving packet in a designated one of a plurality of queues according to the destination thereof; a bandwidth management control section which adds tokens corresponding to a bandwidth set value predetermined for each destination, but not exceeding a prescribed upper limit value, at every predetermined interval to each of a plurality of token buckets corresponding to the plurality of queues, and which, when a packet is output from any one of the plurality of queues, removes tokens corresponding to the packet length of the output packet from the token bucket corresponding to the queue from which the packet is output; and a scheduling section which sequentially refers to the plurality of queues in a predetermined order, and which outputs packets one by one if any packets are stored in the queue referred to and if tokens contained in the token bucket corresponding to the queue referred to are larger in value than a predetermined threshold value, wherein: the scheduling section has a bandwidth management mode in which the packets are output only when the tokens contained in the token bucket corresponding to the queue referred to are larger in value than the predetermined threshold value, and a surplus bandwidth mode in which, when the tokens contained in the token bucket corresponding to every queue in which any packet is stored are not larger in value than the threshold value, the queues are referred to sequentially in a predetermined order and the stored packets are output one by one until the next update interval arrives; and if any packet is being output in the surplus bandwidth mode at the time of arrival of the update interval, the bandwidth management control section performs control so that tokens equal in value to the time required to output a remaining portion of the packet being output are removed from the corresponding token bucket.

In the example of FIG. 4, tokens equal in value to the length of the portion E along which the output of the last packet in the surplus bandwidth mode overlaps into the next interval are removed from the token bucket #2. As a result, the number of packets that can be output from the queue #2 in the bandwidth management mode is reduced, for example, the packet G is not output, allowing the packet F in the queue #0 to be output in the interval B-C, and the token discarding at the update time C can thus be avoided.

The problem of token discarding that can occur due to the effects of packets output in the surplus bandwidth mode can also be avoided by the earlier described method of setting the upper limit value of the tokens differently, depending on whether there is a packet remaining in the corresponding queue, or by combining the above two methods.

According to another aspect of the present invention, the third object is achieved by providing a bandwidth management apparatus comprising: a queue management control section which stores each arriving packet in a designated one of a plurality of queues according to the destination thereof; a bandwidth management control section which adds tokens corresponding to a bandwidth set value predetermined for each destination, but not exceeding a prescribed upper limit value, at every predetermined interval to each of a plurality of token buckets corresponding to the plurality of queues, and which, when a packet is output from any one of the plurality of queues, removes tokens corresponding to the packet length of the output packet from the token bucket corresponding to the queue from which the packet is output; and a scheduling section which sequentially refers to the plurality of queues in a predetermined order, and which outputs packets one by one if any packets are stored in the queue referred to and if tokens contained in the token bucket corresponding to the queue referred to are larger in value than a predetermined threshold value, wherein: the scheduling section has a bandwidth management mode in which the packets are output only when the tokens contained in the token bucket corresponding to the queue referred to are larger in value than the predetermined threshold value, and a surplus bandwidth mode in which, when the tokens contained in the token bucket corresponding to every queue in which a packet is stored are not larger in value than the threshold value, the queues are referred to sequentially in a predetermined order and the stored packets are output one by one until the next update interval arrives; and the scheduling section controls the order in which the queues are referred to in the surplus bandwidth mode, independently of the order in which the queues are referred to in the bandwidth management mode.

By controlling the queue reference order in the surplus bandwidth mode independently of that in the bandwidth management mode, it become possible to avoid a situation where the probability of selecting a particular queue in the surplus bandwidth mode increases.

BRIEF DESCRIPTION OF THE DRAWINGS

FIG. 8 is a diagram for explaining the estimation of an upper limit value for a token bucket when the surplus bandwidth mode is permitted;

FIG. 9 is a timing chart showing one example of control according to a second embodiment of the present invention; and FIG. 10 is a timing chart showing one example of control according to a third embodiment of the present invention.

DESCRIPTION OF THE PREFERRED EMBODIMENTS

Figure 6:
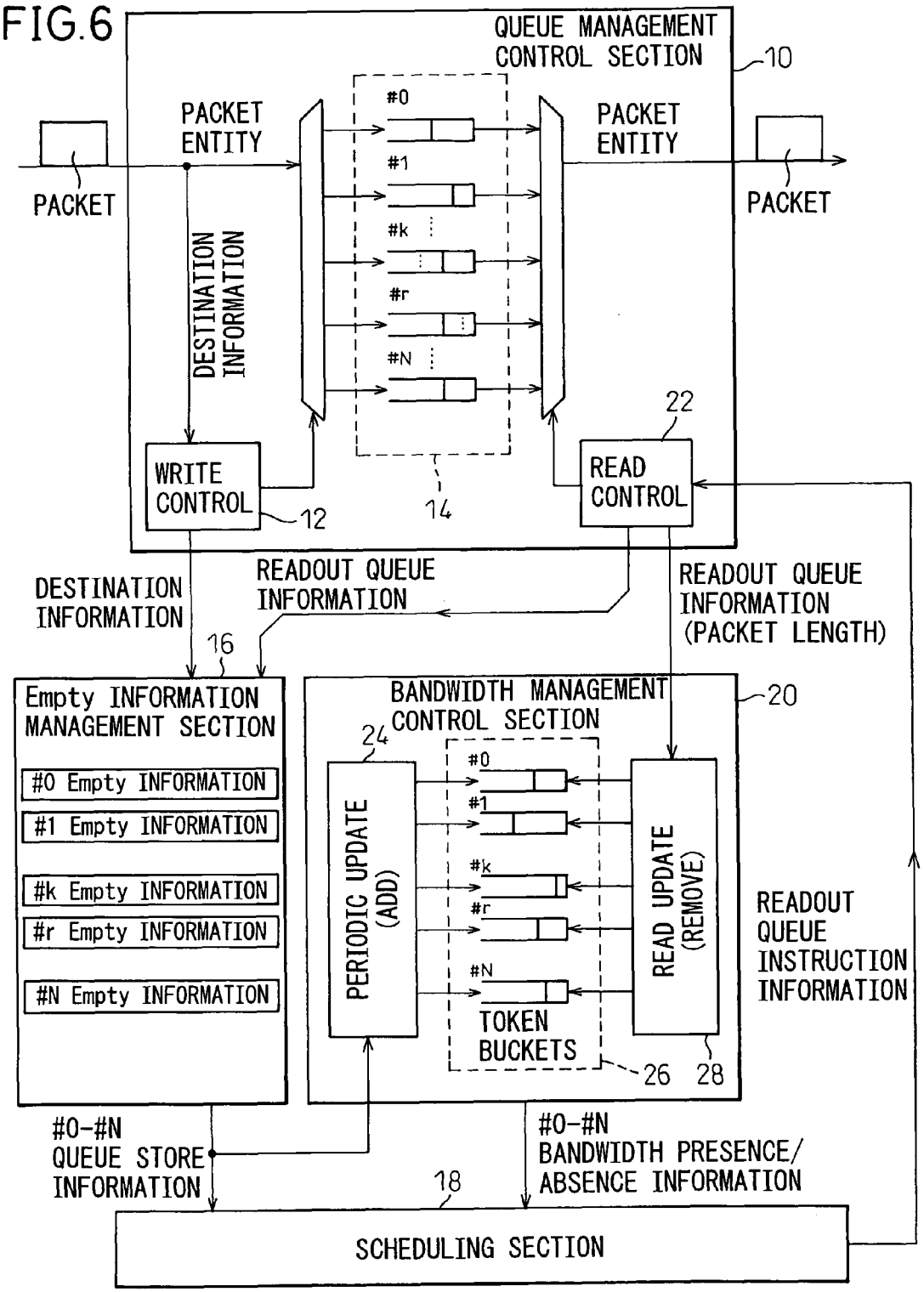
FIG. 6 is a block diagram showing one configuration example of a bandwidth management apparatus to which the present invention is applied.

FIG. 6 shows one configuration example of a bandwidth management apparatus to which the present invention is applied.

In the packet storing process, a write control section 12 in a queue management control section 10 extracts destination information (#K) from each arriving packet, and stores it in a designated one of packet buffers 14 according to its destination; at the same time, the destination information (#K) of the packet stored in the packet buffer 14 is sent to an empty information management section 16. In the empty information management section 16, "Empty" information for that destination is changed to "Not Empty".

In the packet readout process, a scheduling section 18 receives the "Empty" information for each queue from the empty information management section 16, and also receives bandwidth presence/absence information for each queue from a bandwidth management section 20 indicating whether there is any remaining bandwidth for the queue. Based on the received information, the scheduling section 18 selects one queue in accordance with a simple round robin scheme from among the queues for which there is remaining bandwidth and for which the "Empty" information indicates "Not Empty", and outputs readout queue instruction information. A read control section 22 in the queue management control section 10 reads out the packet from the packet buffer 14 in accordance with the readout queue instruction information received from the scheduling section 18, outputs the packet, and reports the number of the readout queue to the empty information management section 16 and the number of the readout queue and the packet length of the output packet to the bandwidth management section 20. In the empty information management section 16, the "Empty" information is updated to "Empty" if the readout queue has become empty; otherwise, the "Empty" information remains "Not Empty".

In the bandwidth management control process, a periodic update section 24 in the bandwidth management section 20 adds tokens equal in value to the bandwidth set value predetermined for each destination, but not exceeding a prescribed upper limit value (to be described later), to each token bucket 26. Upon receiving the number of the readout queue and the packet length of the output packet from the read control section 22 in the queue management control section 10, a read update section 28 in the bandwidth management section 20 removes tokens equal in value to that packet length from the corresponding token bucket. The bandwidth management section 20 sends the bandwidth presence/absence information to the scheduling section 18 to notify whether the token value of the thus processed token bucket is positive or negative.

With the above configuration, the bandwidth management is realized in which packets are output in accordance with the bandwidth set value predetermined for each packet destination.

Figure 1:
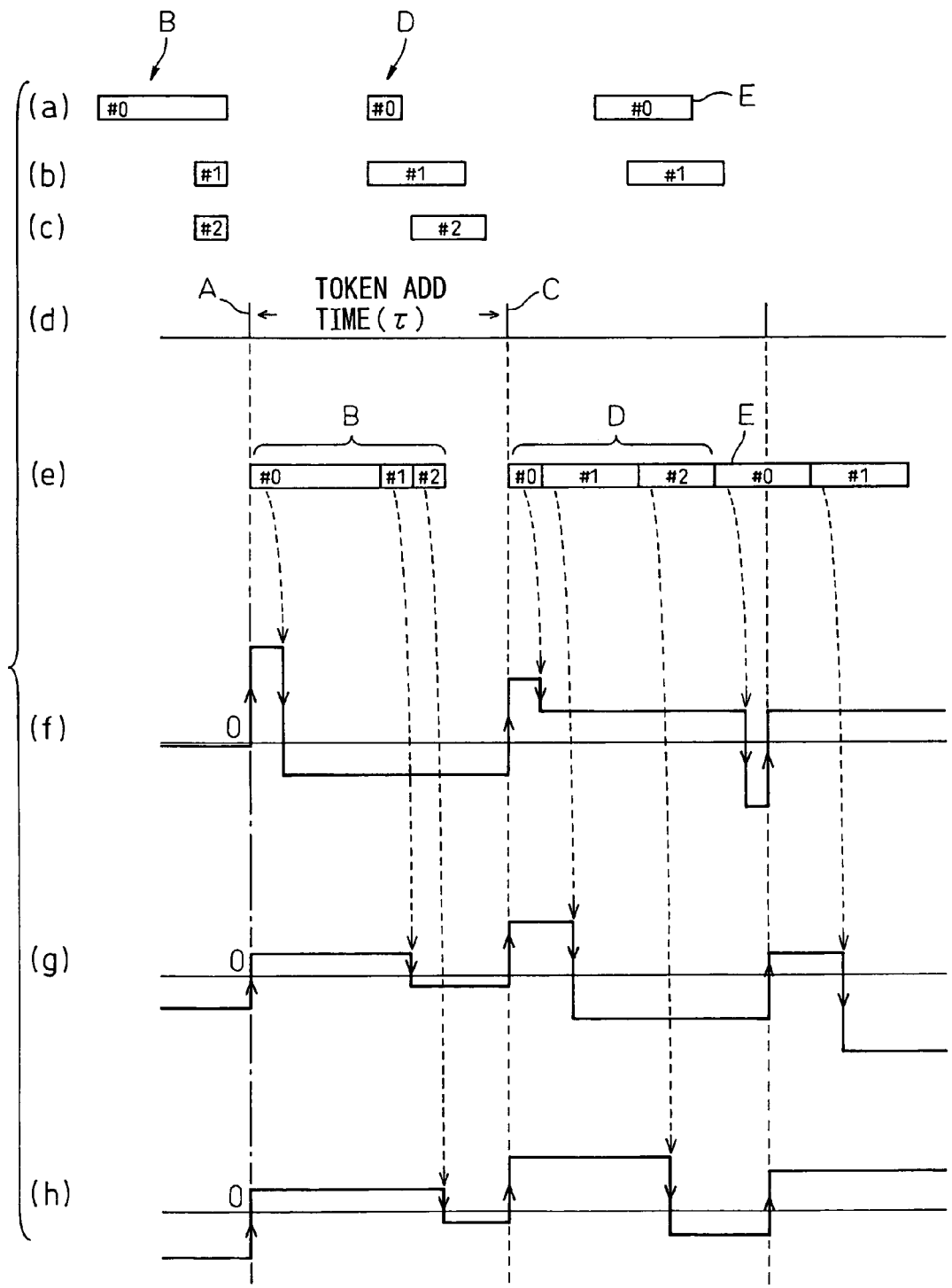
FIG. 1 is a timing chart showing one example of control in a bandwidth management mode.
Figure 2:
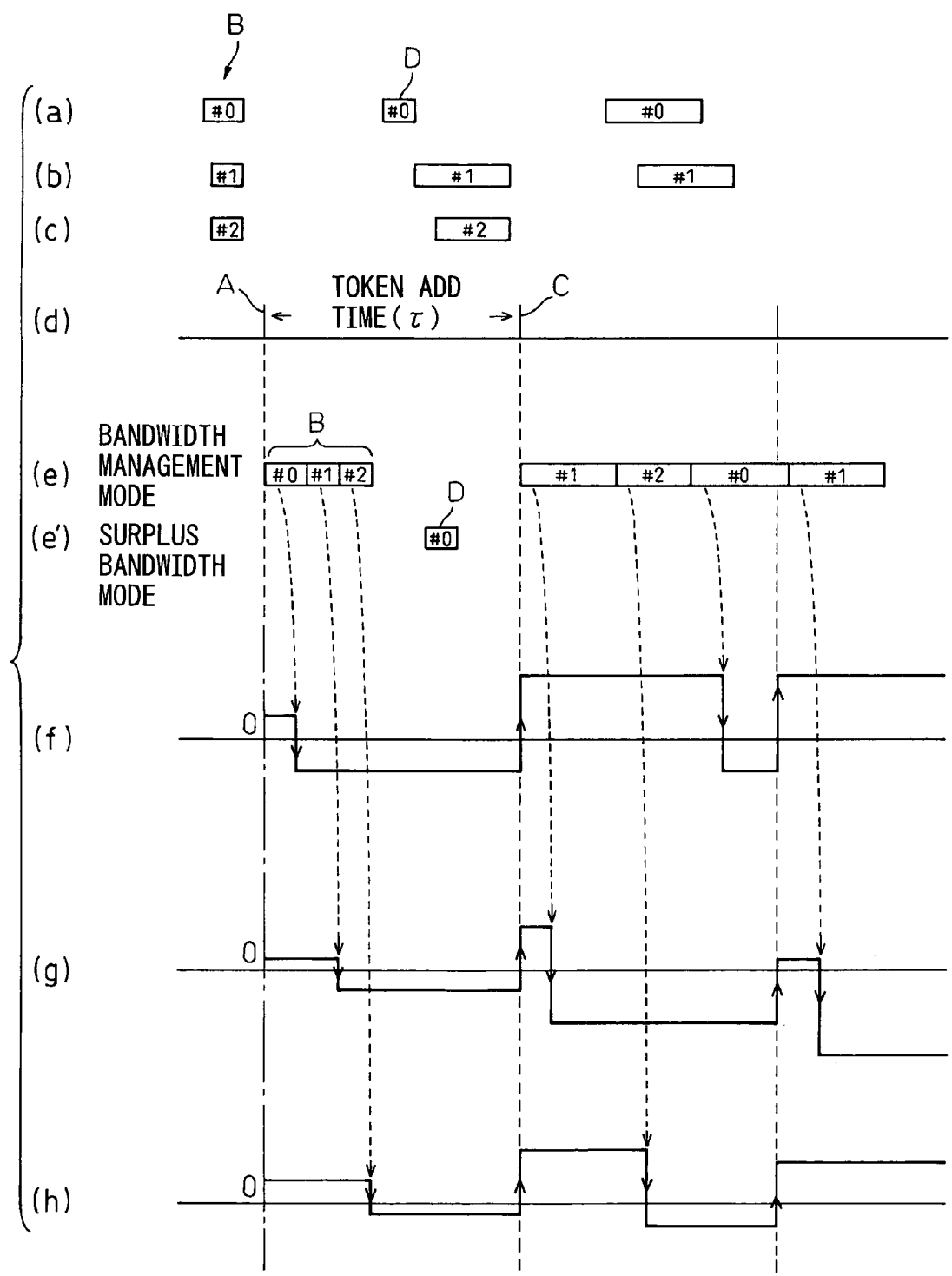
FIG. 2 is a timing chart for explaining a surplus bandwidth mode.
Figure 3:
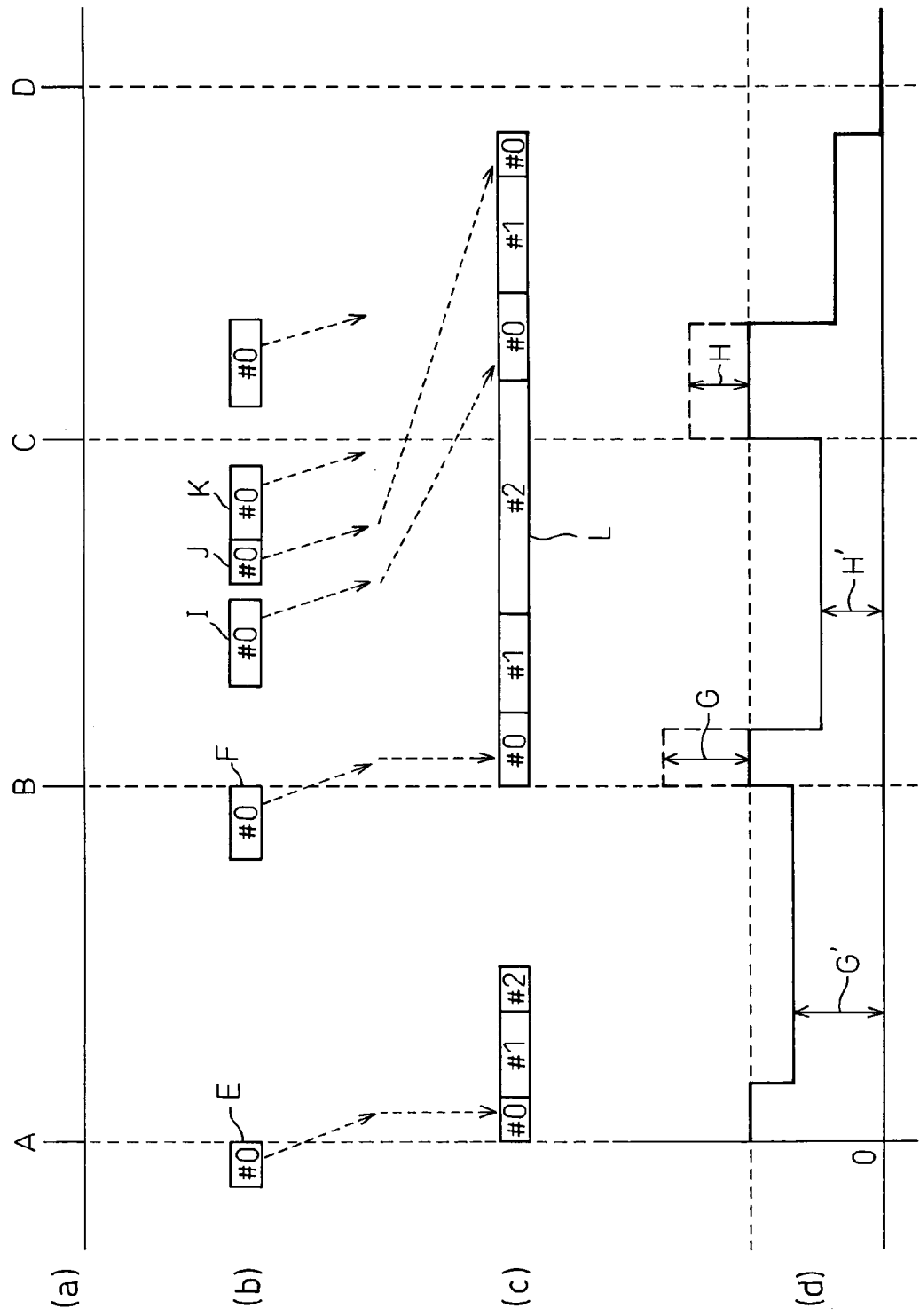
FIG. 3 is a timing chart for explaining a problem that can occur in the bandwidth management mode.
Figure 7:
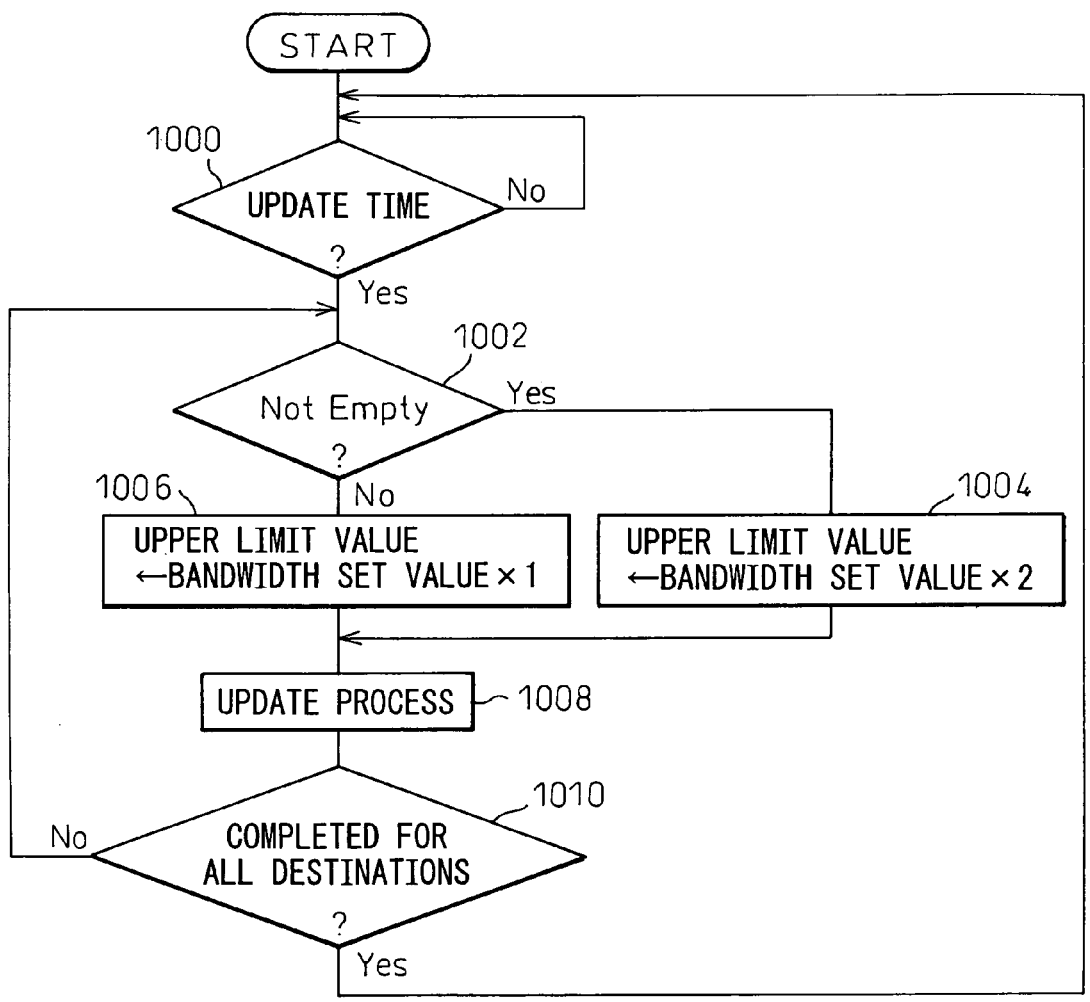
FIG. 7 is a flowchart showing one example of processing according to a first embodiment of the present invention.

FIG. 7 is a flowchart showing one example of the processing performed by the periodic update section 24 in the bandwidth management section 20 according to a first embodiment of the present invention. In this embodiment, the information from the empty information management section 16 is also sent to the periodic update section 24, as shown in FIG. 6. Based on this information, the periodic update section 24 sets the upper limit value of the token bucket differently, depending on whether there is any packet remaining in the corresponding queue, in order to avoid the token-discard situation such as described with reference to FIG. 3, i.e., the situation where even when there is a packet in the queue, the packet cannot be output because of the influence from other channels. In FIG. 7, when the update time arrives (step 1000), it is determined whether the queue is empty or not (step 1002) and, if the queue is not empty, the upper limit value is set to twice the bandwidth set value (step 1002). On the other hand, if the queue is empty, the upper limit value is set equal to the bandwidth set value×1 (step 1006). Using the thus set upper limit value, the earlier described update process is performed (sep 1008), and if the processing is not yet completed for all the queues (destinations) (step 1010), the process returns to step 1002 to repeat the processing in steps 1002, 1004, 1006, and 1008. If the processing is completed for all the queues, the process returns to step 1000 to wait for the arrival of the next update time.

The upper limit value for the "Not Empty" case need not be limited to twice the bandwidth set value, but it may be set suitably according to how much truncation is allowable, provided that the upper limit value is set higher than the upper limit value for the "Empty" case. Considering the ease of implementation, it is desirable that the upper limit value here be set equal to an integral multiple of the bandwidth set value. Similarly, the upper limit value for the "Empty" case may be set, for example, equal to twice the bandwidth set value, provided that it is set lower than the upper limit value for the "Not Empty" case.

Figure 4:
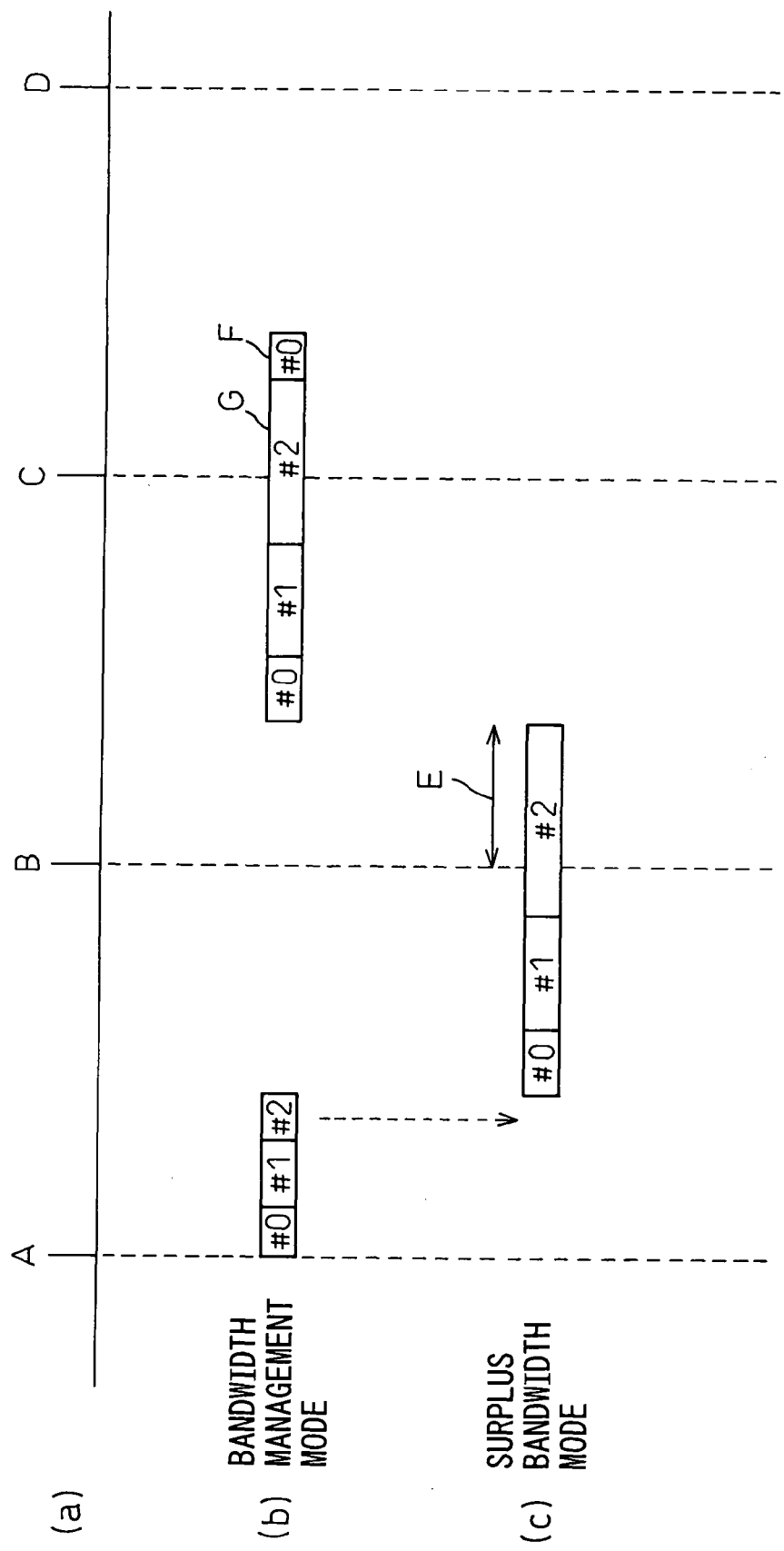
FIG. 4 is a timing chart for explaining a first problem that can arise when the surplus bandwidth mode is permitted.
Figure 5:
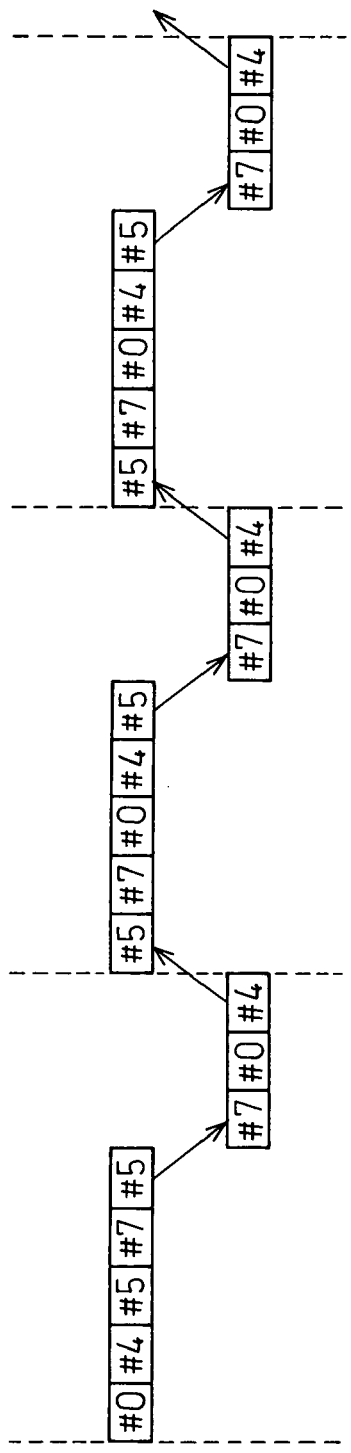
FIG. 5 is a timing chart for explaining a second problem that can arise when the surplus bandwidth mode is permitted.

When the surplus bandwidth mode is permitted, situations such as described with reference to FIG. 4 can occur in overlapping fashion; therefore, the upper limit value for the "Not Empty" case must be set higher than when only the bandwidth management mode is performed. If the upper limit value for the "Not Empty" case when the surplus bandwidth mode is permitted is to be estimated on the safest side, this should be done by assuming the case where, as shown in FIG. 8, the longest packet is output in the surplus bandwidth mode immediately before the update time, followed by the output of the longest packet from other than the attention queue #0 in the bandwidth management mode. If a packet destined for #0 arrives during this period, the packet cannot be output, but the number of times that the update time is expected to arrive during this period should be calculated here. If Q denotes the number of queues installed, Tlp the output time duration of the longest packet, and Tpu the update period; then, the length of the above period is given by $$Tlp \times Q$$

and the number of times that the update time is expected to arrive during that period is given by $$fix(Tlp \times Q/Tpu)$$

where fix(x) is the integer part of x. Accordingly, if the token bucket size is set to fix(Tlp×Q/Tpu)×Maximum Value of Bandwidth Set Value, the truncation can be completely avoided.

However, as the upper limit value needs to be set to the above value only when a packet destined for #0 arrives at every update time during the above period, the actually required upper limit value may be determined by multiplying the above value by the packet store probability. The packet store probability is calculated by $$(Ri \times (Q \times Tlp)/Lsp) \times Tsp/(Q \times Tlp) = Ri \times Tsp/Lsp$$

where Ri is the packet input rate, Lsp is the minimum packet length, and Tsp is the input time.

FIG. 9 is a diagram for explaining a second embodiment of the present invention. Part (a) shows the packets output in the bandwidth management mode, part (b) shows the packets output in the surplus bandwidth mode, part (c) shows how the token value of the token bucket #0 changes, and part (d) shows how the token value of the token bucket #2 changes.

When, as shown in part (b), the packet from the queue #2, permitted to be output in the surplus bandwidth mode during the interval A-B by the scheduling section 18 (FIG. 6), overlaps into the next interval B-C as indicated by an arrow E, the read update section 28 in the bandwidth management section 20 (FIG. 6) removes tokens E' equal in value to the overlapped portion from the token bucket #2 (part (d)). As a result, the value of the token bucket for the queue #2 becomes negative; therefore, unlike the case of FIG. 4, the output from the queue #2 is not permitted in the ensuing bandwidth management mode and, hence, the packet F from the queue #0 is output during the interval B-C. Token discarding at the next update time C can thus be avoided (part (c)).

More generally, if the packet output in the surplus bandwidth mode overlaps into the next interval, and the start of the packet output in the bandwidth management mode in that next interval is therefore delayed, as the value of the token bucket for the queue that caused the overlapping is reduced by an amount corresponding to the overlapping, reducing the chance of packet output from that queue, the chance of packet output from other queues increases correspondingly; as a result, the chance of consuming the accumulated tokens increases, and the chance of token discarding thus decreases.

FIG. 10 is a diagram for explaining a third embodiment of the present invention. In this embodiment, the scheduling section 18 performs round robin control in the bandwidth management mode and the surplus bandwidth mode independently of each other. Accordingly, in the example shown in FIG. 10, irrespective of the number of the queue that output the last packet in the bandwidth management mode, packets are output in the surplus bandwidth mode in the order of #0, #4, #5, #7, #0, and so on, thus ensuring fairness between channels.

The invention claimed is:

1. A bandwidth management apparatus, comprising:
a queue management controller to store each arriving packet in one of a plurality of queues according to a destination of the packet;
a bandwidth management controller to add tokens corresponding to a bandwidth set value predetermined for each destination, but not exceeding a prescribed upper limit value, at every predetermined interval to each of a plurality of token buckets corresponding to said plurality of queues, and which, when a packet is output from any one of a plurality of said queues, removes tokens corresponding to a packet length of said output packet from the token bucket corresponding to said queue from which said packet is output; and
a scheduler operating under a bandwidth management mode and a surplus bandwidth mode, where in said bandwidth management mode said packets are output only when the tokens contained in the token bucket corresponding to any one of the queues sequentially referred to are larger in value than a predetermined threshold value, and in said surplus bandwidth mode when the tokens contained in the token bucket corresponding to every queue in which any packet is stored are not larger in value than the threshold value, said queues are referred to sequentially in a predetermined order and said stored packets are output one by one until a next update interval arrives, and further, in said bandwidth management mode the upper limit value of said tokens to be contained in said token bucket when any packet is stored in any one of said plurality of queues is set higher than the upper limit value when no packets are stored in the any one of queues in which any packet is stored and the threshold value is 0 and the upper limit value of said tokens when any packet is stored in said corresponding queue is set equal to twice or a larger integral multiple of said bandwidth set value, while the upper limit value of said tokens when no packets are stored in said corresponding queue is set equal to said bandwidth, while in said surplus bandwidth mode the upper limit value of said tokens to be contained in said token bucket when any packet is stored in any one of said plurality of queues is set higher than the upper limit value when no packets are stored in the any one of queues in which any packet is stored and said threshold value is 0 and the upper limit value of said tokens when any packet is stored in said corresponding queue is set equal to a value calculated from a number of queues installed in said bandwidth management controller, a time required to output a packet of a longest packet length, and an update interval.

2. A bandwidth management apparatus according to claim 1, further comprising a stored packet information manager configured to receive destination information of each said packet stored in each said queue and notify said scheduler and periodic update section of the stored packet information regarding all of said queues based on the received destination information.

3. A bandwidth management apparatus comprising:
a queue management controller to store each arriving packet of variable length as it is in one of a plurality of queues according to a destination of the packet;
a bandwidth management controller to add tokens corresponding to a bandwidth set value predetermined for each destination, but not exceeding a prescribed upper limit value, at every predetermined interval to each of a plurality of token buckets corresponding to said plurality of queues, and which, when a packet is output from any one of a plurality of said queues, removes tokens corresponding to the packet length of said output packet from the token bucket corresponding to said queue from which said packet is output; and
a scheduler which sequentially refers to the plurality of said queues in a predetermined order, and which outputs packets one by one when any packets are stored in any one of the queues and when tokens contained in the token bucket corresponding to the any one of queues are larger in value than a predetermined threshold value, wherein:
said scheduler has a bandwidth management mode in which said packets are output only when the tokens contained in the token bucket corresponding to any one of the queues sequentially referred to are larger in value than said predetermined threshold value, and a surplus bandwidth mode in which, control is performed so that packet output permissions are granted to queues reserved for users contracted for a use of surplus bandwidth when the tokens contained in the token bucket corresponding to every queue in which any packet is stored are not larger in value than said threshold value, said queues are referred to sequentially in a predetermined order and said stored packets are output one by one until a next update interval arrives, and when any packet is being output in said surplus bandwidth mode at a time of arrival of said update interval, said bandwidth management controller performs control so that tokens equal in value to a time required to output a remaining portion of said packet being output are removed from said corresponding token bucket and comprises a periodic update section which is configured to set the upper limit value of said tokens to be a value equal to twice or a larger integral multiple of said bandwidth set value for each of said token buckets at said every predetermined interval when any packet is stored in the corresponding queue, while configured to change and set the upper limit value of said tokens to be a value equal to said bandwidth set value for each of said token buckets at said every predetermined interval when no packets are stored in the corresponding queue.

4. A bandwidth management apparatus comprising:
a queue management controller to store each arriving packet in one of a plurality of queues according to a destination of the packet;
a bandwidth management controller to add tokens corresponding to a bandwidth set value predetermined for each destination, but not exceeding a prescribed upper limit value, at every predetermined interval to each of a plurality of token buckets corresponding to each of a plurality of said queues, and which, when a packet is output from any one of a plurality of said queues, removes tokens corresponding to a packet length of said output packet from the token bucket corresponding to said queue from which said packet is output; and
a scheduler which sequentially refers to the plurality of said queues in a predetermined order, and which outputs packets one by one when any packets are stored in any one of the queues and when tokens contained in the token bucket corresponding to the any one of the queues sequentially referred to are larger in value than a predetermined threshold value, wherein:
said scheduler has a bandwidth management mode in which said packets are output only when the tokens contained in the token bucket corresponding to any one of the queues sequentially referred to are larger in value than said predetermined threshold value, and a surplus bandwidth mode in which, when the tokens contained in the token bucket corresponding to every queue in which any packet is stored are not larger in value than said threshold value, said queues are referred to sequentially in a predetermined order and said stored packets are output one by one until a next update interval arrives, and
said scheduler controls the order in which said queues are referred to in said surplus bandwidth mode, independently of the order in which said queues are referred to in said bandwidth management mode, wherein the packets are output in a constant order in the surplus bandwidth mode, regardless of a number of the queue from which the packet is output last in the bandwidth management mode, while the packets are output in a constant order in the bandwidth management mode, regardless of a number of the queue from which the packet is output last in the surplus bandwidth mode, and said bandwidth management controller comprising a periodic update section which is configured to set the upper limit value of said tokens to be a value equal to twice or a larger integral multiple of said bandwidth set value for each of said token buckets at said every predetermined interval when any packet is stored in the corresponding queue, while configured to change and set the upper limit value of said tokens to be a value equal to said bandwidth set value for each of said token buckets at said every predetermined interval when no packets are stored in the corresponding queue.

5. A method of managing a bandwidth, comprising:

storing each arriving packet in one of a plurality of queues according to a destination of the packet, by a queue management controller;

adding tokens corresponding to a bandwidth set value predetermined for each destination, but not exceeding a prescribed upper limit value, at every predetermined interval to each of a plurality of token buckets corresponding to said plurality of queues, by a bandwidth management controller;

referring to the plurality said queues in a predetermined order, and outputting packets one by one when any packets are stored in any one of the queues and when tokens contained in the token bucket corresponding to the any one of the queues are larger in value than a predetermined threshold value, by a scheduler; and removing tokens corresponding to said queue from which said packet is output when a packet is output from any one of a plurality of said queues, by the bandwidth management controller;

wherein the adding tokens include setting the upper limit value of said tokens to be a value equal to twice or a larger integral multiple of said bandwidth set value for each of said token buckets at said every predetermined interval when any packet is stored in the corresponding queue, while changing and setting the upper limit value of said tokens to be a value equal to said bandwidth set value for each of said token buckets at said every predetermined interval when no packets are stored in the corresponding queue, by the bandwidth management controller, wherein under a bandwidth management mode, the upper limit value of said tokens to be contained in said token bucket when any packet is stored in any one of said plurality of queues is set higher than the upper limit value when no packets are stored in any one of queues in which any packet is stored and the threshold value is 0 and the upper limit value of said tokens when any packet is stored in said corresponding queue is set equal to twice or a larger integral multiple of said bandwidth set value, while the upper limit value of said tokens when no packets are stored in said corresponding queue is set equal to said bandwidth, and wherein under a surplus bandwidth mode, the upper limit value of said tokens to be contained in said token bucket when any packet is stored in any one of said plurality of queues is set higher than the upper limit value when no packets are stored in the any one of queues in which any packet is stored and said threshold value is 0 and the upper limit value of said tokens when any packet is stored in said corresponding queue is set equal to a value calculated from a number of queues installed in said bandwidth management controller, a time required to output a packet of a longest packet length, and an update interval.

* * * * *